(12) United States Patent
Krul et al.

(10) Patent No.: US 9,179,796 B2
(45) Date of Patent: Nov. 10, 2015

(54) BEVERAGE MAKING CONTAINER FOR PLACEMENT ONTO A CUP

(75) Inventors: Robert Krul, Winnipeg (CA); Robert Amborsky, Winnipeg (CA)

(73) Assignee: Cornelia Bean Ltd., Winnipeg, MB (CA)

( * ) Notice: Subject to any disclaimer, the term of this patent is extended or adjusted under 35 U.S.C. 154(b) by 393 days.

(21) Appl. No.: 12/888,095

(22) Filed: Sep. 22, 2010

(65) Prior Publication Data

US 2012/0067221 A1  Mar. 22, 2012

(51) Int. Cl.
*A47J 31/00* (2006.01)
*A47J 31/06* (2006.01)
*A47J 31/057* (2006.01)
*A47J 31/02* (2006.01)
*A47G 19/14* (2006.01)

(52) U.S. Cl.
CPC .................................... *A47J 31/061* (2013.01)

(58) Field of Classification Search
USPC ....... 99/275, 279, 289 R, 299, 300, 318, 298, 99/317, 323, 306; 222/110, 20, 587, 589, 222/162; 251/4, 6, 7
See application file for complete search history.

(56) References Cited

U.S. PATENT DOCUMENTS

| | | | |
|---|---|---|---|
| 4,479,797 A * | 10/1984 | Kobayashi et al. | 604/153 |
| 4,638,928 A * | 1/1987 | Webster | 222/155 |
| 4,682,537 A * | 7/1987 | Snowball et al. | 99/282 |
| 4,898,090 A | 2/1990 | Chan | |
| 5,249,706 A * | 10/1993 | Szabo | 222/20 |
| 5,826,493 A | 10/1998 | Tien Lin | |
| 6,058,827 A | 5/2000 | Lin Tien | |
| D432,205 S | 10/2000 | Tien Lin | |
| 6,164,190 A | 12/2000 | Tien Lin | |
| 6,327,965 B1 | 12/2001 | Lin Tien | |
| 6,343,542 B1 | 2/2002 | Shen | |
| 6,805,040 B1 | 10/2004 | Chang | |
| 6,871,660 B2 * | 3/2005 | Hampsch | 137/1 |
| 2007/0125238 A1 * | 6/2007 | Urquhart et al. | 99/275 |
| 2007/0194186 A1 * | 8/2007 | Mars | 248/206.2 |
| 2009/0057348 A1 | 3/2009 | Tien | |
| 2009/0173300 A1 * | 7/2009 | Takeo | 123/90.39 |
| 2009/0230337 A1 * | 9/2009 | Hoppe et al. | 251/62 |
| 2009/0272276 A1 | 11/2009 | Lin Tien | |
| 2010/0024659 A1 * | 2/2010 | Liu | 99/306 |
| 2010/0212509 A1 | 8/2010 | Tien | |

* cited by examiner

*Primary Examiner* — Tu B Hoang
*Assistant Examiner* — Michael Hoang
(74) *Attorney, Agent, or Firm* — Adrian D. Battison; Ade & Company Inc.

(57) ABSTRACT

An apparatus for brewing a beverage has a base arranged to sit on a support surface with the water and ingredients in an upper urn portion until brewed following which the liquid is discharged from the urn through a filter and into a tube passing through the base into a receptacle. A valve in the form of pinch member acting on the tube closes the tube and is released to discharge the beverage by a movable plate mounted on the base and actuated by placing the base on a receptacle. The urn is formed as a separately molded piece from glass so that it is more hygienic than the plastic material of the base. The bottom of the urn fits into a receptacle in the base with a disk shaped seal connecting to the tube.

17 Claims, 10 Drawing Sheets

Figure 9

BEVERAGE MAKING CONTAINER FOR PLACEMENT ONTO A CUP

This invention relates to a beverage making container for placement onto a cup with a valve operable to release the beverage after infusion into the cup.

BACKGROUND OF THE INVENTION

Beverage making containers of this type can be used for coffee, tea or other tea type materials where the ingredients are placed in the container and hot water is added to infuse the active ingredients into the water allowing the beverage to be discharged while the ingredients remain trapped in the container.

Melitta manufacture a device of the type where the container supports a paper filter and the water is poured onto the ingredients in the filter and are allowed to drip through the filter at a rate determined by the filter paper. Devices of this type are generally not suitable for tea and tea type materials because the ingredients must remain sitting in the water for a longer period to effect steeping of the tea.

Other device of this general type include a valve at the bottom which actively holds the materials in the container until the steeping action is complete. Such a device is sold by Adagio teas under the trade mark "Ingenuitea". This includes a plate at the bottom which sits on top of the top rim of a cup and activates the valve to release the beverage through a duct into the cup.

Examples of this type of device are also shown in the following patent documents:

U.S. Pat. No. 4,898,090 (Chan) assigned to Melitta discloses a filter container arranged to be mounted on a specially adapted jug.

U.S. Pat. No. 5,826,493 (Lin Tien) issued Oct. 27, 1998 shows an infusion urn of this type formed in two pieces fastened together including an upper container piece for the liquid and a bottom movable piece which is arranged to sit on a cup. A valve is formed by a stopper mounted on a pin carried by the bottom piece. The stopper is moved upwardly with the bottom piece when the device is placed on a cup so that the stopper moves from a seat at the bottom of the upper container piece to open the valve and allow discharge of the contents of the infusion urn. A filter is located in the bottom of the urn above the stopper so that the ingredients are collected in the urn while the liquid discharges.

U.S. Pat. No. 6,058,827 (Lin Tien) issued May 9, 2000 discloses a similar arrangement to that of the above patent.

U.S. Pat. No. 6,164,190 (Lin Tien) issued Dec. 26, 2000 discloses further similar arrangement where a one piece urn has a bottom plate arranged to sit on the rim of the cup which pushes upwardly to distort a buckling disk to move the stopper upwardly.

U.S. Pat. No. 6,327,965 (Lin Tien) issued Dec. 11, 2001 and U.S. Pat. D432,205 (Lin Tien) show further examples of devices of this type.

US Published Application 2009/0272276 (Lin Tien) published Nov. 5, 2009 and US Published Application 2010/0212509 (Lin Tien) published Aug. 26, 2010 show further examples of devices of this type.

US Published Application 2009/0057348 (Pao-Wu Tien) published Mar. 5, 2009 shows a further example of devices of this type using a different type of valve which has a through bore and is operated manually by a thumb wheel.

U.S. Pat. No. 6,343,542 (Shen) issued Feb. 5, 2002 discloses an arrangement of this type which has a steel ball forming the valve activated by a manual trigger on the handle.

U.S. Pat. No. 6,805,040 (Chang) issued Oct. 19, 2004 discloses an arrangement of this type which has a mushroom shaped valve activated by a manual trigger on the handle.

SUMMARY OF THE INVENTION

It is one object of the invention to provide an improved apparatus of this general type.

According to one aspect of the invention there is provided an apparatus for brewing a beverage comprising:

a base having a bottom engagement portion for sitting on a planar support surface;

an urn mounted on the base for containing a liquid and one or more beverage ingredients for brewing the beverage in the container;

a discharge opening at the bottom of the urn such that beverage from the urn is discharged from the container through the base into the receptacle when the beverage is brewed;

a filter at a bottom of the urn for filtering the beverage ingredients from the beverage as it is discharged;

a valve for maintaining the liquid and the beverage ingredients in the urn for brewing of the beverage and operable to allow the discharge of the beverage into the receptacle;

a movable member mounted on the base for movement relative to the base for operating the valve to discharge of the beverage;

the base and the urn being separate components releasably connected together.

Preferably the urn has a bottom connection portion which cooperates with a portion of the base to provide a connection acting to hold the base and urn together.

Preferably the bottom connection portion and the portion of the base are shaped to cooperate to prevent, when engaged, separation of the portions.

Preferably there is provided a connection between an outer peripheral surface of the bottom connection and the portion of the base.

Preferably the base includes a generally cup shaped receptacle at the top into which a matching bottom portion of the urn is inserted.

Preferably the receptacle and the bottom portion are generally cylindrical.

Connection between the urn and the base can be provided by a threaded coupling therebetween or can be provided as a snap coupling or as a press coupling.

Preferably the urn has an opening at the bottom and there is provided a seal between the urn and the base.

Preferably the seal comprises a resilient disk.

Preferably the seal is compressed by engagement of the bottom of the urn and the base.

Preferably the seal is attached to or integral with a tube which extends downwardly from the sealing disk to a discharge opening at the bottom of the base.

Preferably the tube extends through a passage formed in the base and the valve operates on the tube.

Preferably the valve comprises a pinch member arranged to pinch the tube. However other types of valve can be used including gate valves.

Preferably the pinch member comprises a rotatable shaft with a cam portion thereon for pinching the tube. However other techniques for pinching the tube can be used.

Preferably the movable member is carried on the base for engaging a top of the cup when the base is placed on the cup, the movable member being movable upwardly in the base in response to contact with the cup and wherein movement of the movable member causes operation of the pinch member.

Preferably the pinch member is biased into a pinching action and the movable member acts to move the pinch member out of pinching action.

Preferably the urn and the base are formed of dissimilar materials, for example, the urn is formed of glass in order to maintain the contents in material which is more sanitary and the base is formed of plastic.

Preferably both the urn and the base are molded.

As an alternative, the urn is formed of stainless steel and the base if formed of plastic. As a further alternative, the urn can be formed of a ceramic material or even can have an insulated wall which may be of the vacuum type.

The arrangement can also be formed in three pieces which are comprised of the urn, the base and a separate valve system which can be inserted into the base.

The resilient disk seal and tube are formed of a food grade rubber or similar material.

According to a second aspect of the invention there is provided an apparatus for brewing a beverage comprising:

a base having a bottom engagement portion for sitting on a planar support surface;

an urn mounted on the base for containing a liquid and one or more beverage ingredients for brewing the beverage in the container;

a discharge opening at the bottom of the urn such that beverage from the urn is discharged from the container through the base into the receptacle when the beverage is brewed;

the discharge opening being connected to a discharge duct passing though the base;

a filter at a bottom of the urn for filtering the beverage ingredients from the beverage as it is discharged;

a valve for closing the discharge duct to maintain the liquid and the beverage ingredients in the urn for brewing of the beverage and operable to allow the discharge of the beverage into the receptacle;

a movable member mounted on the base for movement relative to the base for operating the valve to discharge of the beverage;

the valve being operable on the discharge duct at position spaced downwardly from the bottom of the urn;

an abutment member carried on the base for engaging a top of the cup when the base is placed on the cup, the abutment member being movable upwardly in the base in response to contact with the cup;

and an operating member movable by the abutment member for operating the valve.

According to a third aspect of the invention there is provided an apparatus for brewing a beverage comprising:

a base having a bottom engagement portion for sitting on a planar support surface;

an urn mounted on the base for containing a liquid and one or more beverage ingredients for brewing the beverage in the container;

a discharge opening at the bottom of the urn such that beverage from the urn is discharged from the container through the base into the receptacle when the beverage is brewed;

the discharge opening being connected to a discharge duct passing though the base;

a filter at a bottom of the urn for filtering the beverage ingredients from the beverage as it is discharged;

a valve for closing the discharge duct to maintain the liquid and the beverage ingredients in the urn for brewing of the beverage and operable to allow the discharge of the beverage into the receptacle;

wherein the duct is formed by a flexible tube and the valve comprises a pinch member arranged to pinch the tube.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
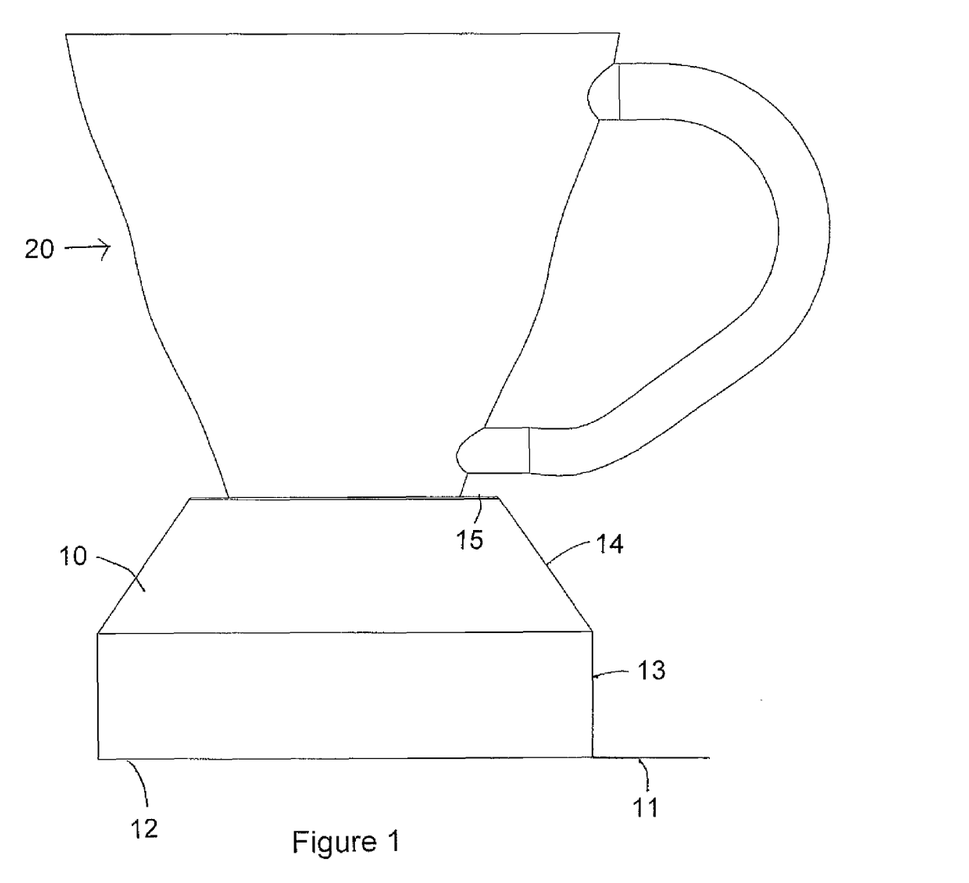
FIG. 1 is a side elevational view of a brewing apparatus according to the present invention.
Figure 2:
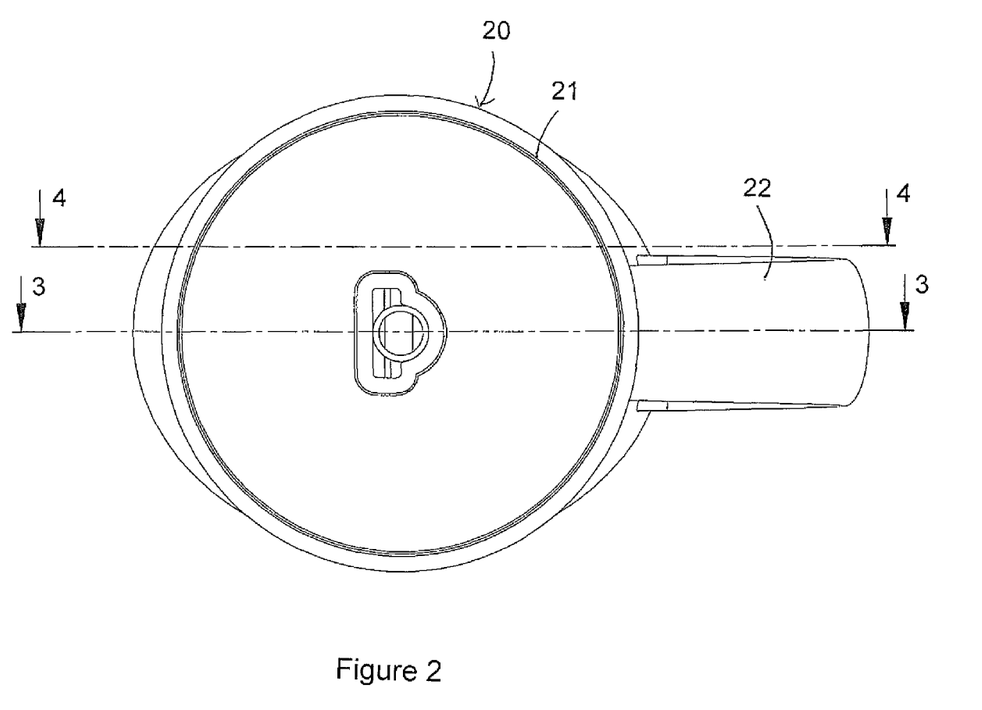
FIG. 2 is a top plan view of the brewing apparatus of FIG. 1.

The apparatus for brewing a beverage as shown in FIG. 1 includes a base 10 molded from a plastic material which is shown circular in plan but can be any configuration moldable via conventional means with a bottom edge 12 for sitting on a planar support surface 11. The base has an outer wall 13 connecting to a frusta-conical upper portion 14 with a circular top 15. A receptacle 16 is recessed into the top 15.

An urn 20 is mounted on the base 10 and is arranged for containing a liquid and one or more beverage ingredients for brewing the beverage in the urn. The shape of the urn can vary in accordance with design requirements. A cover (not shown) may be provided on the open top 21 of the urn with a side lever and hinge to open the cover to allow access to load the urn. A handle 22 is located on one side to allow the urn and base to be lifted. The bottom of the urn includes a generally cylindrical portion 23 extending to a bottom edge 24 with the bottom being open at the inside surface of the cylindrical portion 23 to the circular bottom opening 25 at the bottom edge. The open bottom 25 forms a discharge opening at the bottom of the urn 20.

A filter 30 is provided at a bottom of the urn within the bottom portion 23 for filtering the beverage ingredients from the beverage as it is discharged. The filter is conical in shape to as to stand upwardly from the bottom of the cylindrical portion 23 to a top apex 31. A cylindrical bottom portion 32 of the filter is a snap fit or press fit into the bottom portion 23 so that the filter remains in place during the brewing and discharge process until removed by the user, for example for cleaning.

The base and the urn are separate components releasably connected together. Thus the urn 20 has the bottom cylindrical connection portion 23 which cooperates with the receptacle 16 of the base to provide a connection acting to hold the base and urn together. That is the bottom connection portion 23 and the portion 16 of the base are shaped to cooperate to prevent, when engaged, separation of the portions by simple pulling, although of course they can be separated by the user when required, by carrying out the required separation action depending on the type of connection. Therefore the base 10 includes a generally cup shaped receptacle 16 at the top into which the matching generally cylindrical bottom portion of the urn is inserted.

The connection between the components can be provided by any one of a plurality of different coupling methods in which the outer surface of the urn is connected into a receptacle of the base. These can include a threaded coupling between the bottom portion and the receptacle, a snap coupling between the bottom portion and the receptacle or a press coupling between the bottom portion and the receptacle.

The coupling is located outside the urn on a peripheral surface of the connection component so that there is no necessity to insert components such as removable nuts or screws into the urn. A resilient sealing disk 40 is provided between the bottom edge 24 of the urn and the base. The receptacle 16 thus has a bottom surface or shelf 17 at the middle of which is provided an opening 18 connected to a duct 19 extending downwardly to the bottom surface 11 at or adjacent the plane of the bottom edge 12. The sealing disk 40 is compressed by engagement of the bottom edge 24 of the urn with the shelf 17 of the base. The sealing disk 40 is attached to or integral with a tube 41 which extends downwardly from the seal to a discharge opening 42 at the bottom of the base 10. The tube thus extends through a passage defined by the duct 19 formed in the base. Thus liquid escaping from the open bottom of the urn can pass through the tube to the bottom of the base to discharge into a cup or other receptacle such that beverage from the urn is discharged from the container through the base into the receptacle when the beverage is brewed.

A valve 50 is provided for maintaining the liquid and the beverage ingredients in the urn for brewing of the beverage which is operable to allow the discharge of the beverage into the receptacle. A movable member 51 is mounted on the base 10 for upward movement relative to the base for operating the valve 50 to allow discharge of the beverage. The member 51 forms a flat plate or disk 52 with a center collar 53 slidable on the duct 19 so that it is constrained to move upwardly and downwardly. It falls under gravity or under pressure of a spring 55 to a lower position when the edge 12 is supported on the surface 11. An outer edge 56 of the disk 52 runs just inside the inner surface of the outer wall 13 of the base.

The valve 50 comprises a pinch member 54 arranged to pinch the tube 41. The movable plate 52 is carried on the base for engaging a top of the cup when the base is placed on the cup, the movable member being movable upwardly in the base in response to contact with the cup so that movement of the movable member causes operation of the pinch member 54 to release the pinching action to allow the discharge of the liquid. The pinch member 54 is thus biased into a pinching action and the movable plate acts through a linkage described hereinafter to move the pinch member 54 out of pinching action.

As the urn and the base are formed separately, they can be formed of dissimilar materials. Thus for example the urn can be formed preferably by molding of glass and the base is formed of injection molded plastic. As an alternative, the urn can be formed of stainless steel or ceramic.

Figure 4:
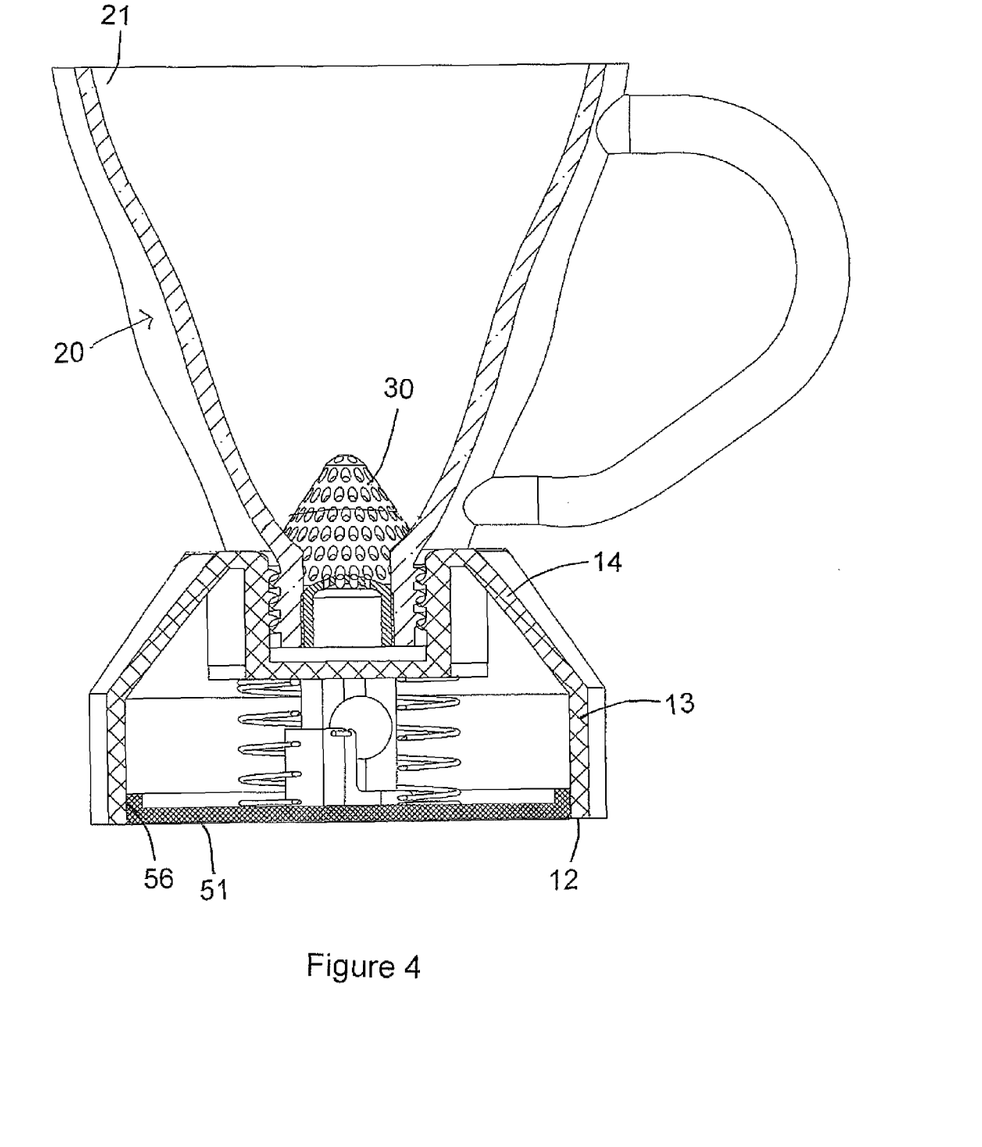
FIG. 4 is a vertical cross-sectional view along the lines 4-4 of FIG. 2 through the first embodiment of FIG. 3.
Figure 4A:
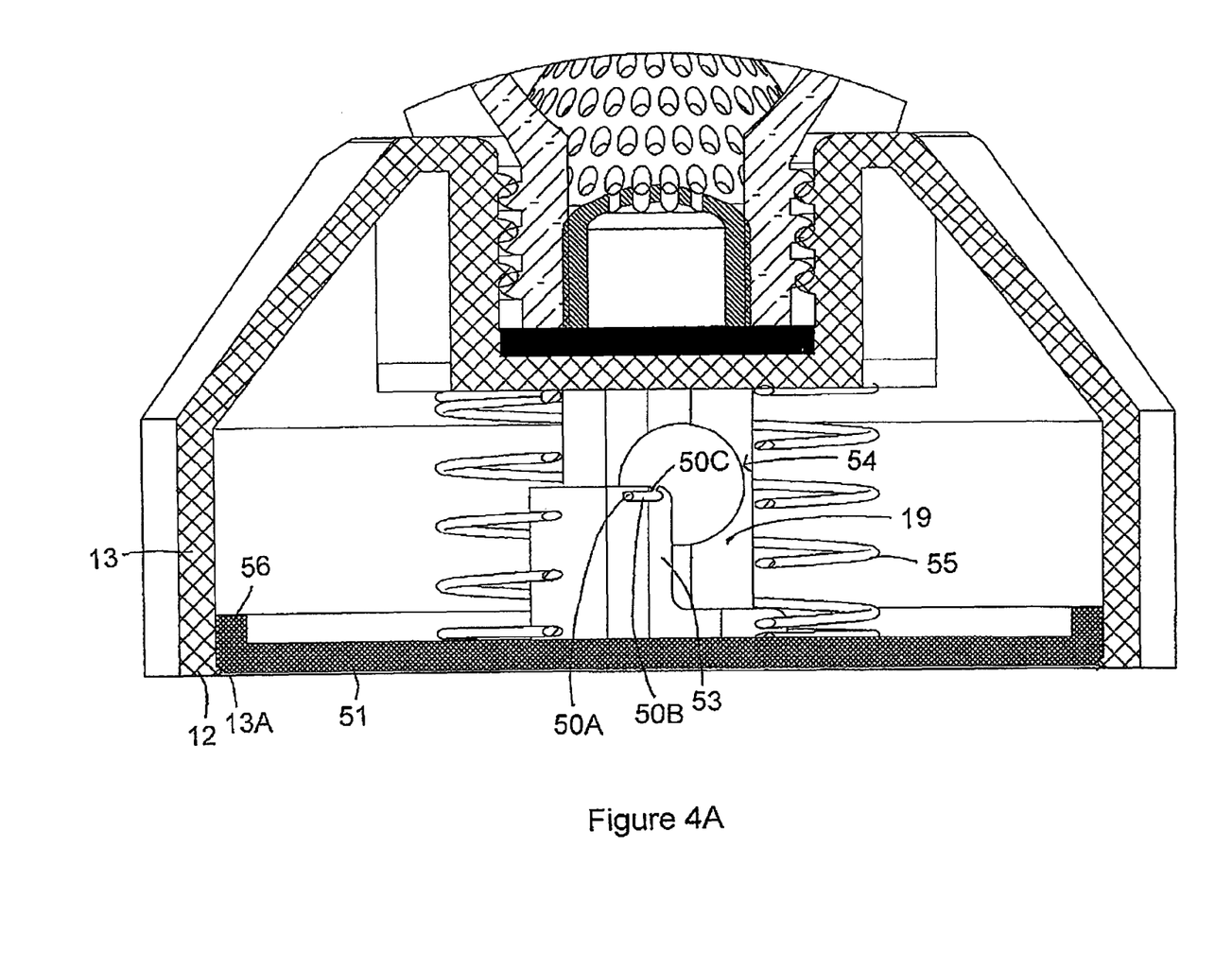
FIG. 4A is a vertical cross-sectional view on an enlarged scale of the base of FIG. 4.

In FIG. 4A, the details of the linkage which operates the pinch member is shown. Thus the member 51 slides up and down the cylindrical duct 19. The spring 55 keeps the member 51 down when no upward pressure from a cup is applied. The member 51 is prevented from being pushed completely out of the cylindrical wall 13 of the base 10 by engagement of the edge 56 of the plate 51 with molded plastic pimples 13A on the inside surface of the wall 13 at the bottom edge 12. The disk or plate 51 can be forced upwardly during assembly to move past the pimples 13A.

The linkage 50 includes the collar 53 which moves with the plate 51. The pinch member 54 carries two steel pins 50A, one at each end each of which snaps into a respective slot 50B cut at the top of the collar 53. As the plate 51 with collar 53 moves upwardly, the slot 50A pushes on the pinch member 54 causing it to rotate out of the pinching position. The slot 50A allows for the position of the pin 50A relative to the collar 53 to change as pinch member 54 rotates, in the form of the known scotch yoke mechanism. The opening 50C at the top of the slot 50B allows the pins 50A to snap into the slot 50B during assembly of the plate 51 and operating mechanism to the base 10.

Figure 5:
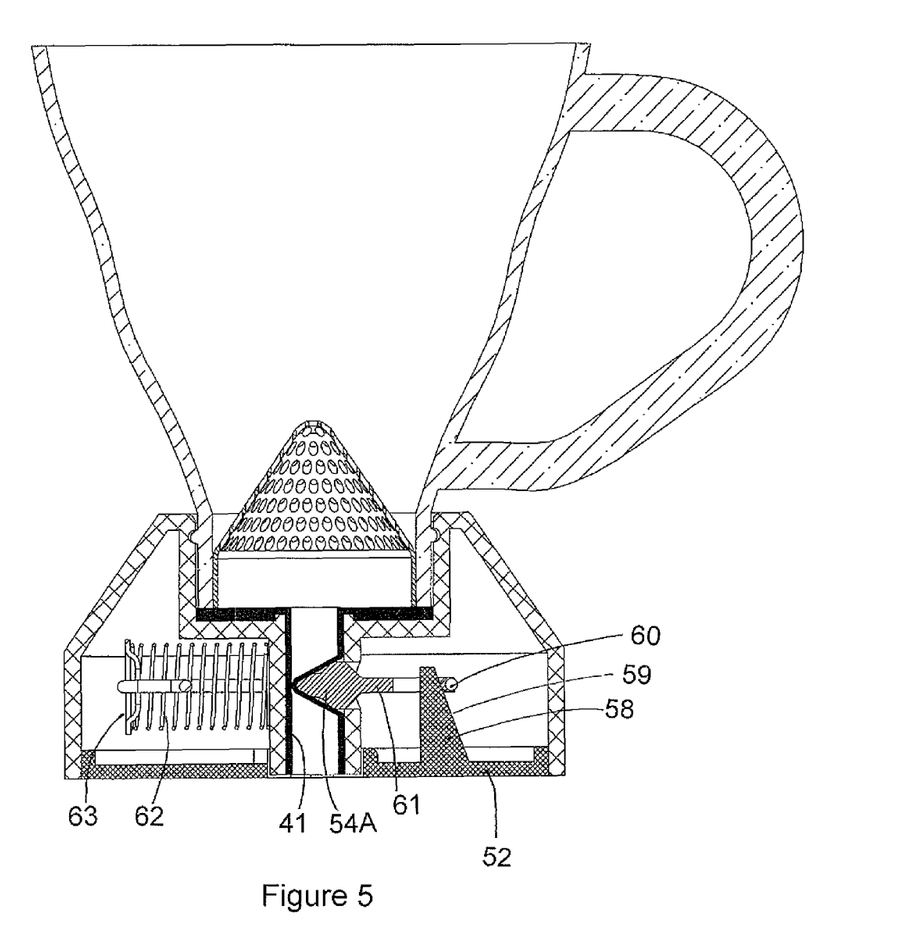
FIG. 5 is a vertical cross-sectional view along the lines 3-3 of FIG. 2 through a second embodiment of brewing apparatus according to the present invention.
Figure 6:
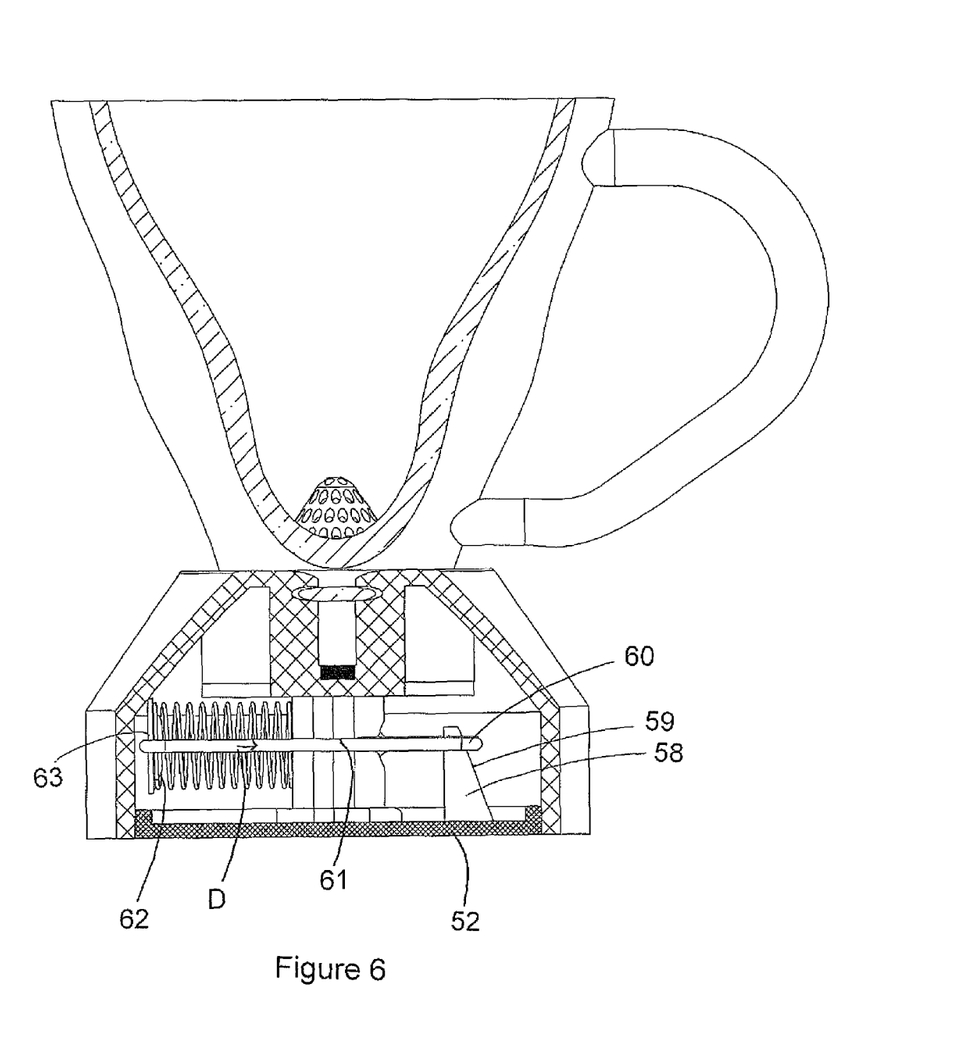
FIG. 6 is a vertical cross-sectional view along the lines 4-4 of FIG. 2 through the second embodiment of FIG. 3.

In FIGS. 5 and 6, an alternative linkage is provided which operates the pinch member. Thus in this arrangement, the plate 52 slides a cam 58 upwardly with a cam surface 59 which acts on a cam follower 60 to pull a rod 61 attached to the pinch member 54A along its length in the direction of arrow D out of the pinching position. The rod and pinch member are biased into the pinching position by a spring 62 surrounding and acting on an end plate 63 of the rod 61.

Figure 3:
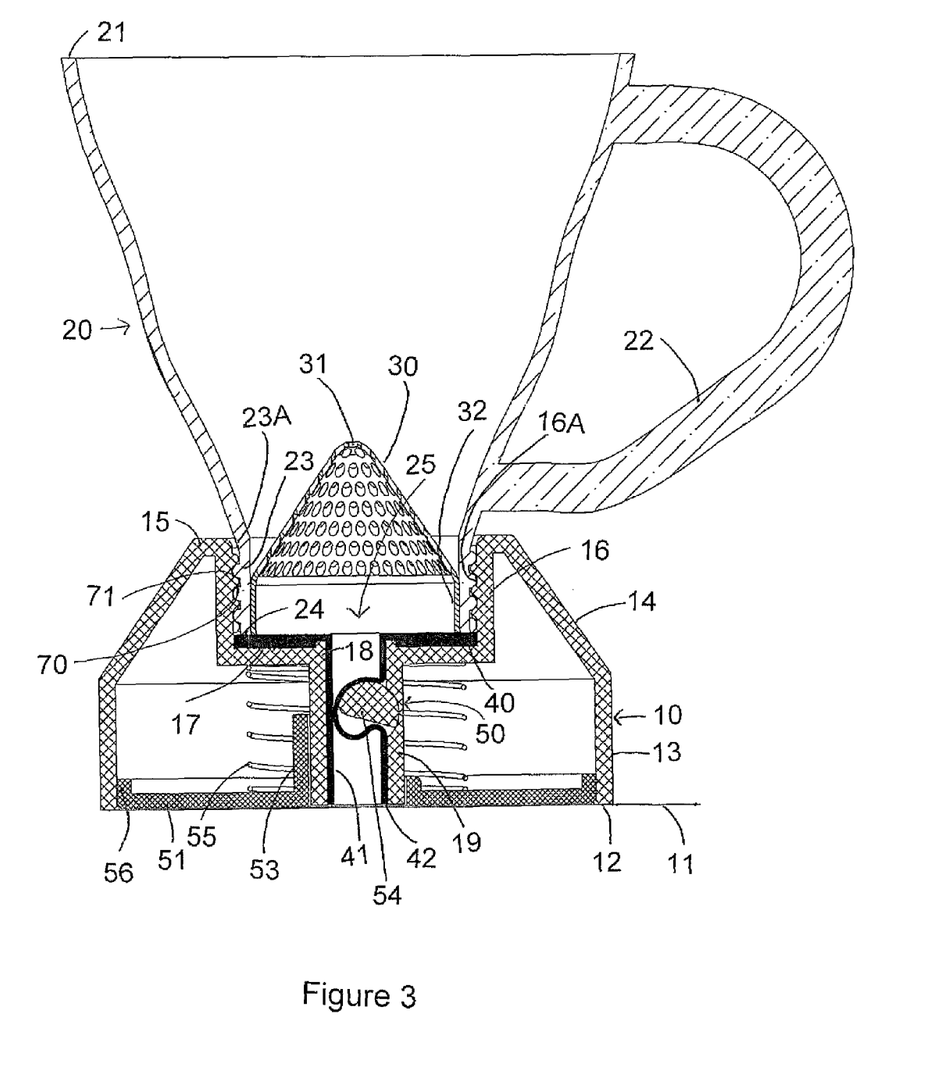
FIG. 3 is a vertical cross-sectional view along the lines 3-3 of FIG. 2 through a first embodiment of brewing apparatus according to the present invention.

In FIG. 3, the mounting of the urn on the base is shown where the urn has a screw thread 70 on an outer surface 23A of the cylindrical portion 23 which cooperates with a female thread 71 on inner surface 16A of the cylindrical wall 16.

Figure 7:
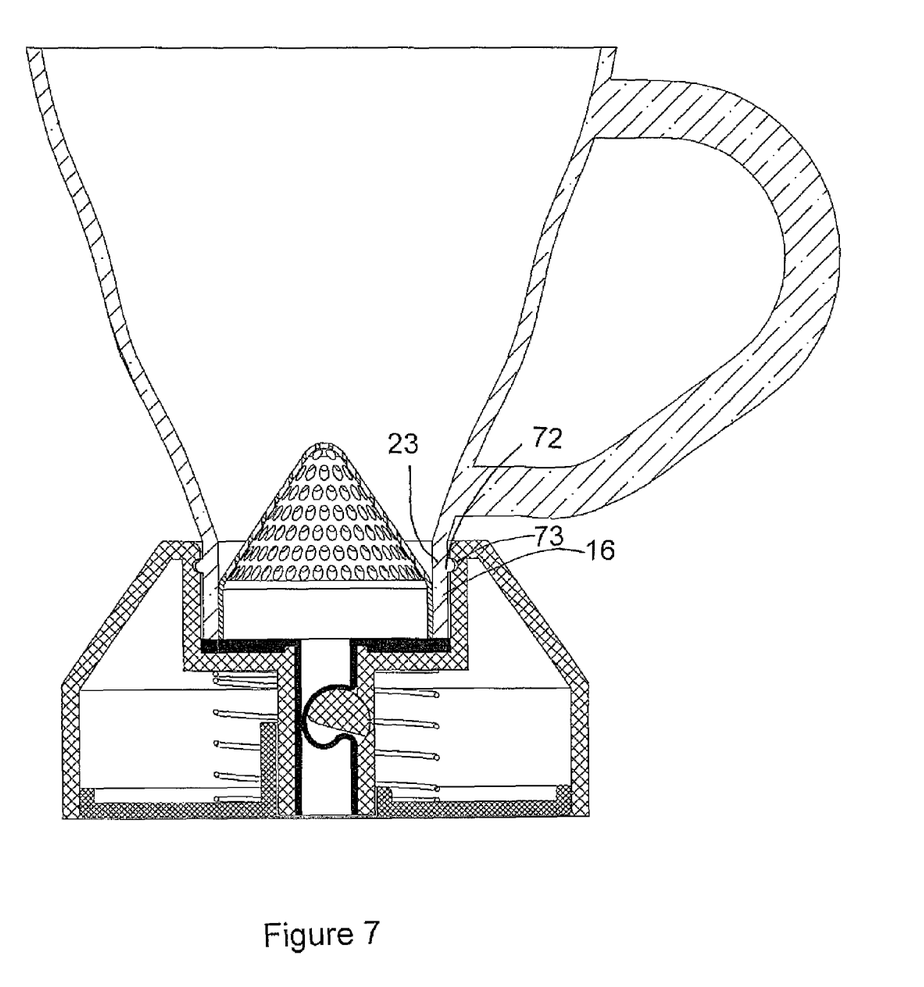
FIG. 7 is a vertical cross-sectional view through a third embodiment of brewing apparatus according to the present invention and showing a different mounting arrangement of the urn.

In FIG. 7, an alternative mounting of the urn on the base is shown where the urn has a snap fastening ring 72 on outer surface of the neck 23 which engages a recess in the inner surface of the cylindrical portion 16.

Figure 8:
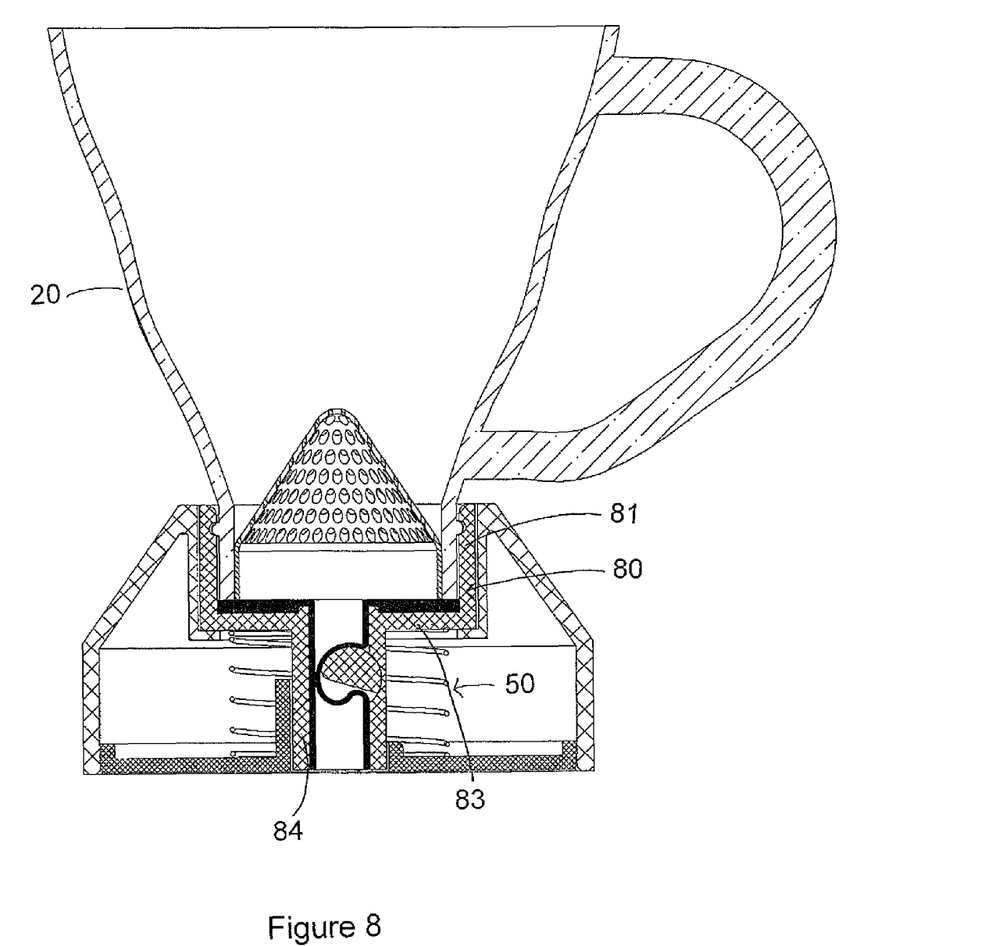
FIG. 8 is a vertical cross-sectional view through a further embodiment of brewing apparatus according to the present invention similar to that of FIG. 7 and showing a different mounting arrangement of the urn.

In FIG. 8, a three-piece arrangement is shown which includes the urn 20 as shown in FIG. 7 where the neck 23 and ring 72 cooperate with a cylindrical wall 81 of an insert piece 80. Thus the base 10 with the receptacle 16 receives the insert piece 80 inserted into the receptacle 16 as a separately molded element which also carries the valve 50 as previously described. The insert piece includes the cylindrical wall 81, a circular base 82 and a duct 84. These receive the flexible disk 40 and tube 41 as previously described. The three piece device allows the base also to be manufactured in different materials and in different shapes for cooperation with different urns with the operating mechanism provided by the valve and the insert pieces which can be molded in plastic. This would allow for ornate bases to be made with a removable valve insert.

Figure 9:
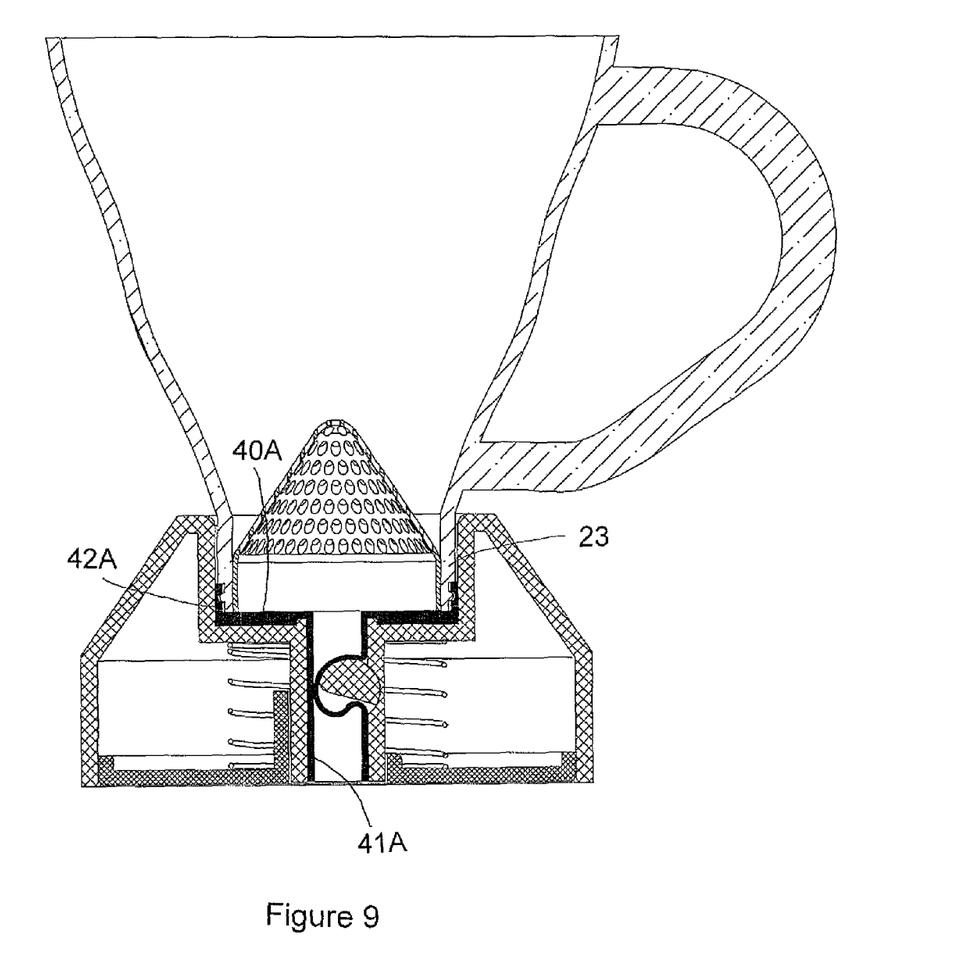
FIG. 9 is a vertical cross-sectional view through a fourth embodiment of brewing apparatus according to the present invention and showing a yet further different mounting arrangement of the urn on the base.

In FIG. 9 a further alternative mounting of the urn on the base is shown. In this arrangement the flexible element formed by the disk 40A and tube 41A are attached to the neck 23 of the urn 20 by a cylindrical band piece 42A around the neck 23. This neck and flexible element are then inserted as a snap fit into the annular wall 16 in the base 10. In this case therefore the flexible element defining the disk and tube is attached to the urn and remains with the urn rather than the tube.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for brewing a beverage comprising:
a base having a bottom engagement portion for sitting on a planar support surface;
an urn mounted on the base for containing a liquid and one or more beverage ingredients for brewing the beverage in the urn;
a discharge opening at the bottom of the urn;
the base and the urn being separate components releasably connected together;
the base having a duct therethrough with a bottom discharge opening such that beverage from the urn is discharged from the discharge opening at the bottom of the urn through the base to the bottom discharge opening of the base when the beverage is brewed;
a filter at a bottom of the urn for filtering the beverage ingredients from the beverage as the beverage is discharged through the discharge opening at the bottom of the urn;
wherein the urn has a bottom connection portion which engages into a receptacle in the base to provide a connection acting to hold the base and urn together;
wherein the urn has a bottom edge of the bottom connection portion surrounding the discharge opening at the bottom of the urn which engages onto a flexible sealing disk in the receptacle of the base to provide a seal between the urn and the base;
wherein the sealing disk is integral with a tube which extends downwardly from a hole in the sealing disk within said bottom edge to said bottom discharge opening of the base;
a valve for maintaining the liquid and the beverage ingredients in the urn for brewing of the beverage and operable to allow the discharge of the beverage from the urn and through the base;
wherein the valve comprises a pinch member arranged to pinch the tube to prevent said discharge;
and a movable member mounted on the base for movement relative to the base for operating said pinch member to release said discharge of the beverage.

2. The apparatus according to claim 1 wherein there is provided a threaded coupling between the bottom connection portion of the urn and the receptacle of the base.

3. The apparatus according to claim 1 wherein there is provided a snap coupling between the bottom connection portion of the urn and the receptacle of the base.

4. The apparatus according to claim 1 wherein there is provided a press coupling between the bottom connection portion of the urn and the receptacle of the base.

5. The apparatus according to claim 1 wherein the pinch member comprises a rotatable shaft with a cam portion thereon for pinching the tube.

6. The apparatus according to claim 1 wherein the pinch member is biased into a pinching action and the movable member acts to move the pinch member out of pinching action.

7. The apparatus according to claim 1 wherein the urn and the base are formed of dissimilar materials.

8. The apparatus according to claim 7 wherein the urn is formed of glass and the base is formed of plastic.

9. The apparatus according to claim 8 wherein both the urn and the base are molded.

10. The apparatus according to claim 1 wherein the urn is formed of stainless steel and the base is formed of plastic.

11. Apparatus for brewing a beverage comprising:
a base having a bottom engagement portion for sitting on a planar support surface;
an urn mounted on the base for containing a liquid and one or more beverage ingredients for brewing the beverage in the urn;
a discharge opening at the bottom of the urn;
the base and the urn being separate components releasably connected together;
the base having a duct therethrough with a bottom discharge opening such that beverage from the urn is discharged from the discharge opening at the bottom of the urn through the base to the bottom discharge opening of the base when the beverage is brewed;
a filter at a bottom of the urn for filtering the beverage ingredients from the beverage as the beverage is discharged through the discharge opening at the bottom of the urn;
the base having a receptacle at a top of the base with a top edge surrounding the receptacle;
wherein the urn comprises a molded body defining an integral bottom connection portion which engages into the receptacle in the base to provide a connection acting to hold the base and urn together;
wherein the urn has a bottom edge of the integral bottom connection portion surrounding the discharge opening at the bottom of the urn which engages onto a flexible sealing disk in the receptacle of the base to provide a seal between the urn and the base;
wherein the urn is shaped such that the urn has no surface butting the top edge of the base so that the bottom edge of the integral bottom connection portion extends into the receptacle to a distance to engage the flexible sealing disk;
and wherein the sealing disk is integral with a tube which extends downwardly from a hole in the sealing disk within said bottom edge to said bottom discharge opening of the base;
and a valve for maintaining the liquid and the beverage ingredients in the urn for brewing of the beverage and operable to allow the discharge of the beverage from the urn and through the base;
wherein the valve comprises a pinch member arranged to pinch the tube to prevent said discharge and a movable member mounted on the base for movement relative to the base for operating said pinch member to release said discharge of the beverage.

12. The apparatus according to claim 11 wherein there is provided a threaded coupling between the bottom connection portion of the urn and the receptacle of the base.

13. The apparatus according to claim 11 wherein there is provided a snap coupling between the bottom connection portion of the urn and the receptacle of the base.

14. The apparatus according to claim 11 wherein there is provided a press coupling between the bottom connection portion of the urn and the receptacle of the base.

15. The apparatus according to claim 11 wherein the urn and the base are formed of dissimilar materials.

16. The apparatus according to claim 11 wherein the urn is formed of glass and the base is formed of plastic.

17. The apparatus according to claim 11 wherein the urn is formed of stainless steel and the base is formed of plastic.

* * * * *